Oct. 30, 1928.
W. J. ALBERSHEIM
1,689,658
SPECIFIC GRAVITY REGISTER
Filed Nov. 13, 1925    2 Sheets-Sheet 1
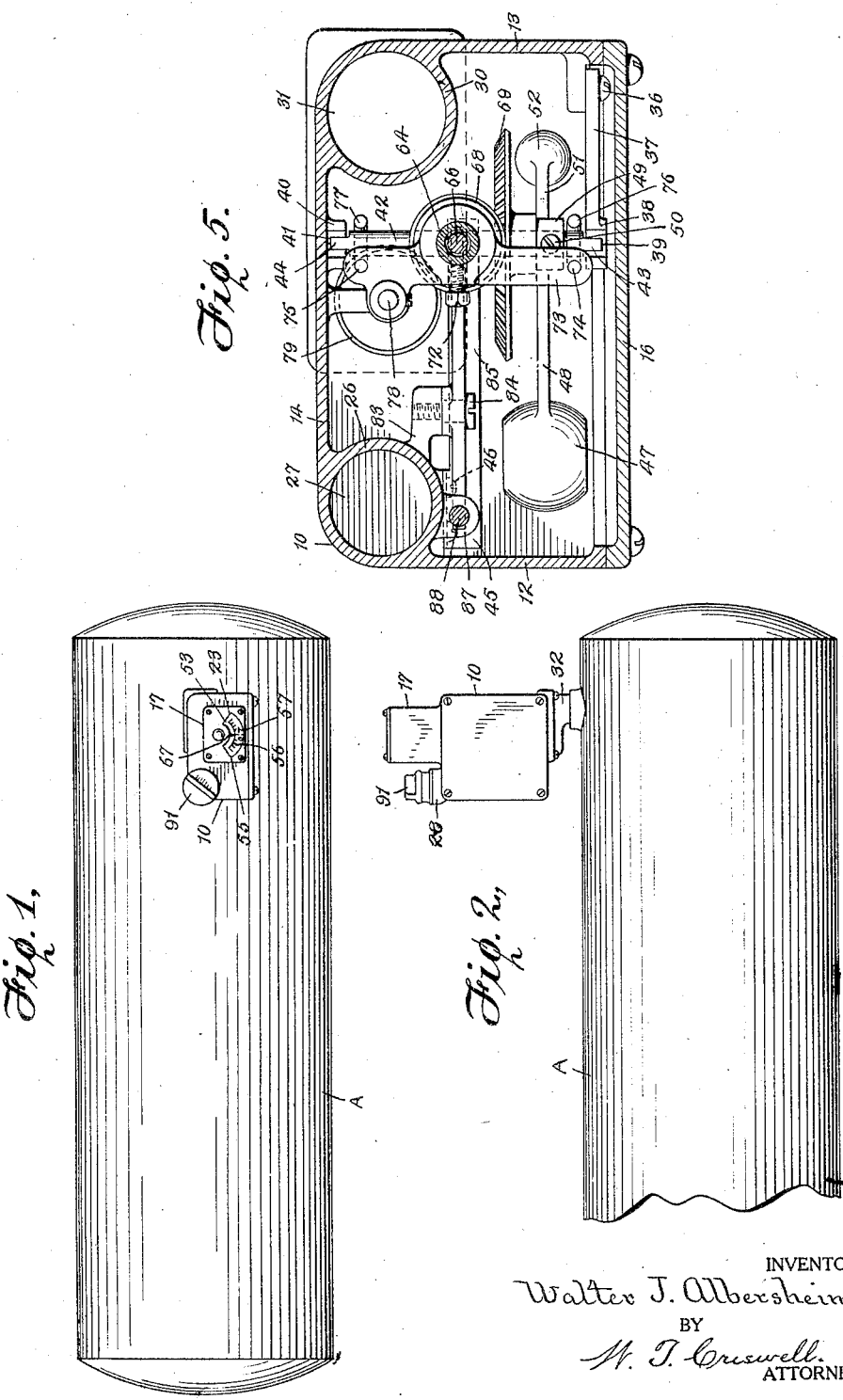
INVENTOR
Walter J. Albersheim.
BY
W. T. Criswell.
ATTORNEY Oct. 30, 1928.
W. J. ALBERSHEIM
1,689,658
SPECIFIC GRAVITY REGISTER
Filed Nov. 13, 1925  2 Sheets-Sheet 2
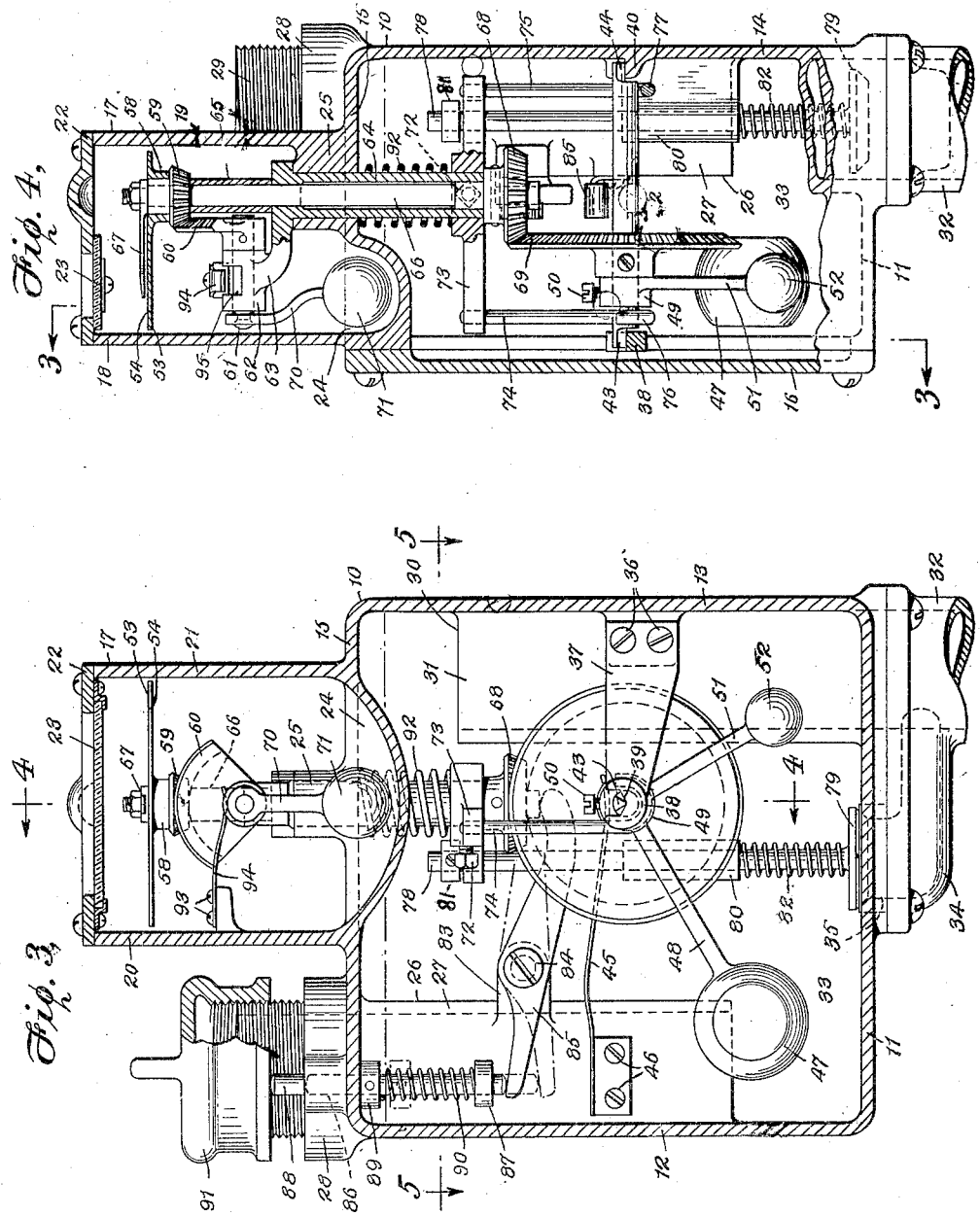
INVENTOR
Walter J. Albersheim.
BY
W. T. Criswell.
ATTORNEY Patented Oct. 30, 1928.

1,689,658

UNITED STATES PATENT OFFICE.

WALTER J. ALBERSHEIM, OF NEW YORK, N. Y.

SPECIFIC-GRAVITY REGISTER.

Application filed November 13, 1925. Serial No. 68,864.

This invention relates more particularly to a class of testing apparatus of a modified form of the indicator disclosed in my co-pending application, serially numbered 68,865, filed November 13, 1925.

My invention has for its object primarily to provide an apparatus or register designed to be employed especially for determining the value of quality of a liquid product with relation to a fixed value as established according to a standardized density or specific gravity of the respective class of liquid substance, and which is adapted for use for testing the specific gravity of milk and other certain liquid products, especially gasoline, in a manner so that consumers may observe if the product varies from its proper standard of value or specific gravity, in order to avoid using adulterated and contaminated liquid, such as when kerosene or other inferior products are mixed with gasoline.

The invention contemplates the provision of a casing which may be applied to any means for conveying the liquid from a source of supply to a receiving receptacle such as the inlet of the fuel tank of an automobile or other motor driven vehicle, and the casing has elements providing an inlet and an outlet for the gaseous fuel to flow therethrough when a supply is delivered to the tank. The inlet and outlet are relatively arranged whereby a portion of the liquid will be retained in the casing, and rotatively supported in the casing is a counterbalanced displacing body of a weight whose specific gravity is approximately similar to the specific gravity of the liquid when of a standard density, said body being submerged in the liquid for being moved by the buoyant effort of the retained liquid when of a density varying from its known standard of density. On the casing is an indicator which may be of a form including a movable scale of specific gravity measurements or symbols and associated with the scale is a pointer which is movable with the movement of the displacing body for indicating the relative difference of density of the liquid during its flow through the casing.

Other objects of the invention are to provide in the casing an auxiliary outlet leading to the main outlet for discharge of the liquid retained in the casing following the cessation of the flow therethrough, to provide a valve for controlling the opening and closing of the auxiliary outlet; to provide means for moving the valve from the auxiliary outlet and for separating and yieldingly holding the displacing body and its cooperating parts from their normal supports in the casing; and to provide means for keeping the scale in a determined position with respect to the pointer independent of the position of the casing.

With these and other objects in view, the invention will be hereinafter more fully described with reference to the accompanying drawings forming a part of this specification in which similar characters of reference indicate corresponding parts in all the views, and will then be pointed out in the claims at the end of the description.

In the drawing, Figure 1 is a top plan of a tank or container with one form of specific gravity register applied thereto.

Fig. 2 is a fragmentary side view of the tank and a side elevation of the register.

Fig. 3 is an enlarged detail sectional view, partly fragmentary and partly broken away, of the apparatus as taken on the line 3—3 of Fig. 4.

Fig. 4 is an enlarged detail sectional view, partly fragmentary, taken on the line 4—4 of Fig. 3, and Fig. 5 is an enlarged detail sectional view taken on the line 5—5 of Fig. 3.

The apparatus has a casing 10 which may be of any suitable size and shape, though the form of the casing illustrated is substantially rectangular to provide a bottom wall 11, side walls 12, 13, a rear wall 14, a top wall 15 and a front wall 16 which is removable to allow the working parts of the apparatus to be assembled and mounted in the casing. On top of the casing 10 at its front wall 16 and between its side walls 12, 13 is a box or chamber 17 having a front wall 18, rear wall 19, side walls 20, 21 and an upper wall 22. In the upper wall 22 of the box 17 is an opening which is closed by a plate of glass 23 to provide an observation window, and part of the portion of the top wall 15 of the casing 10 forming the bottom wall of the box 17 may be concaved or curved downwardly to form a recess, as at 24. The part of the top wall of the casing in proximity to the recess 24 may be enlarged to provide a boss or bearing, as 25, having its passage leading into the interior of the casing 10. Within the casing at the corner of its side wall 12 with the rear wall 14 is a curved partition or wall 26 providing an inlet 27 having its entrance leading through the top wall of the casing into a pipe, as 28, having its upper portion exteriorly threaded, as at 29. Also in the casing 10 at the corner of its side wall 13 with the rear wall 14 is another curved partition or wall 30 providing an outlet 31 having its exit leading through the bottom wall 11 into a discharge pipe, as 32, protruding below the casing. The partition 26 is of a length so that the inlet 27 terminates in spaced relation to the bottom 11 of the casing, and the partition 30 is of such a length that the upper part of the outlet 31 terminates in spaced relation to the top wall 15 of the casing. The portion of the interior of the casing below the upper end of the outlet 31 provides a chamber 33 for retaining a portion of liquid when flowing through the casing. On the underside of the bottom wall 11 of the casing 10 is a duct, as 34, having its passage leading from an opening or auxiliary outlet 35 in the central part of the bottom wall to the passage of the discharge pipe 32. To the central part of the side wall 13 at the front wall 16 is secured, at 36, one end of a bracket 37 of such a length that its other end terminates approximately midway between the side walls, and on the free end of this bracket is a substantially U-shaped bearing, as 38, having the bottom wall of its recess formed in somewhat a V-shape, as at 39. On the inner face of the rear wall 14 of the casing is a similar substantially U-shaped bearing, as 40, also having the bottom wall of its recess formed in somewhat a V-shape, as at 41, and both of the bearings 38 and 40 are on alinement with the entrances of their recesses in opposed relation to the top wall 15 of the casing.

The bearings 38 and 40 support a removable rotative beam or shaft 42 having on its ends approximately V-shaped knife edge pivots or bearings 43, 44 which are movably seated in the V-shaped parts 39, 41 of the recesses of the bearings 38, 40. The rotative beam 42 is yieldingly held rotatively in the bearings 38, 40 by means of a spring 45 in the form of a flat strip of metal having one of its ends fastened, at 46, to the partition wall 26 of the inlet 27 of the casing, and the other end of the spring presses upon the beam with the spring having a thrusting yielding pressure upon the beam to prevent accidental displacement of the beam from the bearings 38, 40 when the beam is under upward pressure. The beam 42 carries a displacing body 47 which may be in the form of a hollow substantially spherical shaped body providing an air chamber, and this displacing body 47 is of a weight whose specific gravity is approximately similar to the specific gravity of the liquid when of a standard density. Extending from part of the float or air chamber is a bar 48 having on its other end a sleeve 49 which is adjustably carried on the beam 42 in proximity to the knife edge bearing 43 of the beam, and a set screw 50 passed through a threaded hole in the sleeve into engagement with the beam for tightening the sleeve to the beam when the displacing body is in an adjusted position. Projecting from the sleeve 49 is a bar 51 having on its other end a weight or ball 52. The bars 48 and 51 are disposed on downward diverging inclines providing a substantially V-shaped lever, and the ball 52 and its bar 51 are of weights with the ball having a specific gravity for counterbalancing the displacing body 47 and its bar 48. During the flow of liquid through the casing 10 from its inlet 27 to and through the outlet 31 the part of the chamber 33 below the mouth of the outlet 31 will retain a portion of the liquid and the displacing body 47 and weight 52 will be submerged. As above explained the displacing body is of such specific gravity that if the liquid is of a standard specific gravity or density the displacing body will not move, but if the liquid varies in specific gravity from its recognized standard of density value the displacing body will by the buoyant effort of the liquid rise or lower for rotatively moving the beam 42 accordingly.

In the box 17 of the casing is a registering device 53 for indicating the difference of specific gravity or density of the liquid flowing through the casing to determine if the liquid varies from its recognized standard of density since the device is designed for testing liquids, such as gasoline, milk or other liquids the grade or quality value of which are established by fixed standards of specific gravities. The registering device 53 may be of any suitable type, though the form of the registering device shown has an arc-shaped or curved plate 54 which is positioned with one of its faces exposed to view through the window 23 of the box 17. On the exposed face of the plate 54 is a scale 55 of spaced measurements in the forms of appropriate characters or markings, as 56, for indicating the relative difference of density of the liquid flowing through the casing as compared with its standard density or specific gravity. For example if the device is used for testing gasoline its standard specific gravity of "0.7" should be inscribed, as at 57, Fig. 1, on the plate 54 at one of the measurement markings 56 of the scale 55, and the other markings are adapted to indicate if the gasoline flowing through the casing varies in density value from its standard specific gravity, as will be hereinafter more fully explained. In part of the plate 54 opposite to the scale 55 is an opening and protruding from the face of the plate opposite to the scale may be a sleeve 58 which surrounds the edge of the opening. On the free end of the sleeve 58 is an annular bevel gear 59 in mesh with a segmental bevel gear, as 60, having its part opposite to its teeth held on one end of a stud 61 which is journaled in a bearing, as 62, provided on one end of a bracket, as 63, having a sleeve 64 projecting downwardly from the underside of its second end. The passage of the sleeve leads through the bracket 63, as well as being in register with the passage of the annular bevel gear 59, and the sleeve 64 is slidably disposed through the fixed bearing 25 of the box 17 so that the lower portion of the sleeve extends into the chamber 33 of the casing 10. On the bracket 63 surrounding its opening which communicates with the passage of the sleeve 64 is another sleeve 65 on the upper end of which is movably supported the annular bevel gear 59, and the passage of the sleeve 65 is in register with the opening through the bevel gear 59. Rotatable in the sleeve 58 of the scale 53, annular bevel gear 59, sleeve 65 and sleeve 64 is a shaft 66 of a length so that its upper end protrudes above the plate 54 of the scale 55 and so that its lower end extends below the sleeve 64 in proximity to the beam 42 of the float 47. On the upper end of the shaft 66 is fixed one end of a pointer 67 which is disposed with its other end directed toward the scale 55 for indicating the specific gravity measurements 56 of the scale when the shaft 66 is revolved. In proximity to the lower end of the shaft 66 is held a bevel gear 68 which meshes with a bevel gear 69 held on the beam 42 of the float 41 so that with the upward or downward movement of the float the bevel gear 69 and bevel gear 68 will rotatively move to revolve the shaft 66 and adjustably swing the pointer 67 across the measurements of the scale 55. The scale 55, bevel gear 59, segmental bevel gear 60 and stud 61 are operative independently of the operation of the pointer 67, and on the stud 61 is held one end of a bar 70 having on its other end a weight or ball 71 which may be movably disposed in the recess 24 of the top wall 15 of the casing. The ball 71 is of a weight for yieldingly holding the stud 61, segmental bevel gear 60 and bevel gear 59 for holding the scale 55 in a determined position with respect to the pointer independent of the position of the casing. That is, if the device is tilted the casing 10 and box 17 will assume inclined positions, and the float 47 with its counterbalancing weight 52 will by reason of gravity cause the beam 42, bevel gears 69, 68 and shaft 66 to operate accordingly for retaining the pointer in its normal position. The gravity of the weight 71 will likewise cause it to assume a position for moving the stud 61, segmental bevel gear 60, bevel gear 59 to adjustably move the plate 54 for positioning the scale 55 so that the pointer will indicate the standard specific gravity marking on the scale irrespective of the position of the casing to enable the apparatus to operate effectually.

On the lower end of the sleeve 64 above the bevel gear 68 is held, at 72, the central part of a cross bar 73 extending toward the front wall 16 and rear wall 14 of the casing 10, and this cross bar is of a length nearly similar to the length of the beam 42 of the float 47. Projecting downwardly from the ends of the cross bar 73 are two rods 74, 75 having their lower ends terminating with hook members 76, 77 respectively. The parts of the beam 42 of the float 47 adjacent the bearings 43, 44 are rotatively disposed in the hook members 76, 77 of the rods 74, 75. In part of the cross bar 73 above the auxiliary outlet 35 of the chamber 33 of the casing is an opening through which is slidably disposed the upper end of the stem 78 of a valve 79 for controlling the opening and closing of the auxiliary outlet 35. The central portion of the stem 78 of the valve 79 is also slidably disposed through a bearing 80 provided on the rear wall 14 of the casing, and on the upper end of the stem of the valve may be a fixed collar 81 for limiting the downward movement of the stem and valve in the cross bar 73 and in the bearing 80. Encircling the stem 78 is a spring 82 having one of its ends pressing upon the valve 79 and having its other end pressing against the bearing 80 for serving to normally force the valve 79 yieldingly on its seat in the auxiliary outlet 35 of the casing for causing a portion of the fluid flowing through the casing to be retained in the chamber 33.

To an arm or bracket, as 83, is fulcrumed, at 84, the central part of a lever or bar 85 of a length so that one of its ends movably engages the lower end of the shaft 66 and so that its other end terminates below the threaded pipe 28 of the inlet 27 of the casing 10. Through the wall of the threaded inlet pipe 28 is a bore 86, and extending from the central part of the partition 26 of the inlet 27 is an apertured lug or bearing 87 having its bore in register with the bore 86. In the bores 86 and 87 is a slidable plunger 88 having its lower end engaging the end of the lever 85 opposite to its end contacting with the shaft 66. The plunger is of such a length that its upper end terminates approximately midway of the threaded end 29 of the inlet pipe 28. On part of the plunger 88 within the casing is fixed a stop collar, as 89, which normally contacts with the underside of the top wall 15 of the casing for limiting the upward movement of the plunger, and encircling the plunger is a spiral spring 90 which presses against the bearing 87 and the collar 89 for serving to normally force the plunger outwardly of the casing. On the threaded end 29 of the inlet pipe 28 is screwed a removable cap 91 for operating the plunger 88 and lever 85 as will be later explained.

Encircling the sleeve 64 of the shaft 66 between the cross bar 73 and the top wall 15 of the casing is a spiral spring 92 normally serving to force the cross bar 73, and the rods 74, 75 in a downward direction so that the hook members 76, 77 of the rod are free of engagement with the beam 42 of the float 47. To the side wall 20 of the box or chamber 17 of the casing 10 is fastened, at 93, one end of a spring 94 in the form of a strip of metal having its other end disposed in a recess, as 95, which is provided in the bearing 62 of the bracket 63, and this spring 94 is tensioned for being contacted by the stud 61 of the bracket 63 for serving to force the stud and its co-operating parts downwardly following being elevated in the casing as will also be later explained.

When the apparatus is put into practice for testing the specific gravity of a liquid, such as gasoline which at a normal temperature has a standard specific gravity of 0.7, the outlet 32 of the casing 10 may be mounted in the inlet of the receiving tank, as A, Figs. 1 and 2, of a motor driven vehicle or the like. The casing will then be disposed with its registering device 53 being exposed through the window 23 of the box 17 of the casing. Following removal of the cap 91 from the inlet pipe 28 of the inlet 27 a pipe from a source of supply is attached to the inlet pipe. The fluid will be admitted into the casing through the inlet 27, and after the chamber 33 of the casing is partly filled with the liquid it will continue to flow to and through the outlet 31 and through the discharge pipe 32 into the tank A. If the gasoline is of normal standard specific gravity the displacing body 47 will move to a position by the buoyant effort of the gasoline for causing the beam 42 and bevel gear 69 to rotatively move which in turn will operate the bevel gear 68, and shaft 66 for moving the pointer into register with the standard density mark 0.7 on the scale 55 of the registering device. In whatever position the casing may be the weight 71 will, as above explained, assume by its gravity a position for rotatably adjusting the stud 61, segmental gear 60 and bevel gear 59 for adjusting the plate 54 and scale 55 in normal related positions to the pointer 67. Should the density of the liquid vary from its standard specific gravity the buoyant effort of the liquid will cause the displacing body to rise or lower for operating the beam 42, bevel gears 69, 68 and the shaft 66 as explained to move the pointer 67 from the standard marking "0.7" on the scale 55 to indicate the ratio of difference of the specific gravity of the liquid to its standard density value. The user of the liquid may then observe through the window 23 if the liquid varies from its standard grade.

When the supply of liquid flowing through the casing is cut-off the cap 91 is screwed on the threaded end 29 of the inlet pipe 28, and the downward rotation of the cap will contact with and force the plunger 88 inwardly of the interior of the casing 10. The plunger will then cause one end of the lever 85 to move on its pivot 84, and the other end of the lever will engage and move the shaft 66 upwardly in the casing. With the upward adjustment of the shaft 66 the bar 73 and rods 74, 75 will be likewise moved to cause the hooks 76, 77 of the rods to engage the beam 42. The beam will be raised from the bearings 38, 40 against the tension of the spring 45 for also raising the displacing body 47 and weight 52. With the elevation of these parts the sleeve 64 will rise against the tension of the spring 92. The sleeve 65, bevel gear 59, scale 55 and pointer 67 will also be raised, and simultaneously therewith the bracket 63, stud 61, weight 71 and segmental gear 60 will be elevated so that the stud will contact with the spring 94 against its tension. With the raising of the bar 73, the stem 78 and valve 79 will be elevated against the tension of the spring 82 to open the auxiliary outlet 35 of the duct 34 to allow the retained liquid in the chamber 33 of the casing to be discharged through the duct into and out of the discharge pipe 32. These operating parts of the apparatus being thus separated and cushioned from their respective supporting parts of the casing will be prevented from being damaged by shocks and vibrations in event of the apparatus being mounted on the fuel tank of an automobile or other vehicle. When it is desired to subsequently operate the apparatus the cap is removed from the inlet pipe 28. The tension of the springs 45, 82, 90, 92, 94 will cause reverse movements of the above mentioned operative parts to their normal positions in the casing 10 and in the box 17.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. A specific gravity register, comprising a casing having provision for flow of liquid therethrough and for retaining a portion of the liquid during its flow, a counterbalanced rotatively supported displacing body in the casing whose specific gravity is approximately similar to the specific gravity of the liquid when of a standard density, said body being submerged in the liquid for being moved by the buoyant effort of the retained liquid when of a density varying from its known standard, means operative by the body when moved to indicate the relative difference of density of the liquid, and means for closing the inlet of the casing and to remove the body from its support and for yieldingly holding the body in its separated position.

2. A specific gravity register, comprising a casing having provision for flow of liquid therethrough and for retaining a portion of the liquid during its flow, a counterbalanced rotatively supported air chamber in the casing whose specific gravity is approximately similar to the specific gravity of the liquid when of standard density, said air chamber being submerged in the liquid for being moved by the buoyant effort of the retained liquid when of a density varying from its known standard, an indicator on the casing, means operative by the air chamber when moved for operating the indicator to register the relative difference of density of the liquid, and means for closing the inlet of the casing and to remove the air chamber from its support and for yieldingly holding the air chamber in its separated position.

3. A specific gravity register, comprising a casing having elements providing an inlet and an outlet for flow of liquid therethrough and said elements being relatively arranged whereby a portion of the liquid will be retained in the casing, a counterbalanced rotatively supported displacing body in the casing whose specific gravity is approximately similar to the specific gravity of the liquid when of a standard density, said body being submerged in the liquid for being moved by the buoyant effort of the retained liquid when of a density varying from its known standard, an indicator on the casing, and gearing operative by the body when moved for operating the indicator to register the relative difference of density of the liquid.

4. A specific gravity register, comprising a casing having elements providing an inlet and an outlet for flow of liquid therethrough and said elements being relatively arranged whereby a portion of the liquid will be retained in the casing, a counterbalanced rotatively supported displacing body in the casing whose specific gravity is approximately similar to the specific gravity of the liquid when of a standard density, said body being submerged in the liquid for being moved by the buoyant effort of the retained liquid when of a density varying from its known standard, means operative by the body when moved to indicate the relative difference of density of the liquid, a removable cap on the inlet of the casing, means providing an auxiliary outlet in the casing leading to the main outlet, a valve controlling the opening and closing of the auxiliary outlet of the casing, and means operative by moving the cap on the inlet of the casing for moving the valve to open the auxiliary outlet of the casing and for separating and yieldingly holding the body, pointer, scale and co-operating parts from their support in the casing.

5. A specific gravity register, comprising a casing having elements providing an inlet and an outlet for flow of liquid therethrough and said elements being relatively arranged whereby a portion of the liquid will be retained in the casing, a counterbalanced rotatively supported air chamber in the casing whose specific gravity is approximately similar to the specific gravity of the liquid when of a standard density, said air chamber being submerged in the liquid for being moved by the buoyant effort of the retained liquid when of a density varying from its known standard, a movable scale of gravity measurements on the casing, a movable pointer for indicating the measurements on the scale, gearing operative by the air chamber when moved for moving the pointer to register on the scale the relative difference of density of the liquid, and a weight for keeping the scale in a determined position with respect to the pointer when the casing is on an incline.

6. A specific gravity register, comprising a casing having elements providing an inlet and an outlet for flow of liquid therethrough and said elements being relatively arranged, whereby a portion of the liquid will be retained in the casing, a counterbalanced rotatively supported displacing body in the casing whose specific gravity is approximately similar to the specific gravity of the liquid when of a standard density, said body being submerged in the liquid for being moved by the buoyant effort of the retained liquid when of a density varying from its known standard, a movable scale of gravity measurements on the casing, a movable pointer for indicating the measurements on the scale, gearing operative by the body when moved for moving the pointer to register on the scale the relative difference of density of the liquid, a removable cap on the inlet of the casing, means providing an auxiliary outlet in the casing leading to said main outlet, a valve controlling the opening and closing of the auxiliary outlet of the casing, and means operative by moving the cap on the inlet of the casing for moving the valve to open the auxiliary outlet of the casing and for separating and yieldingly holding the body, pointer, scale and co-operative parts from their supports in the casing.

7. A specific gravity register, comprising a casing having provision for flow of liquid therethrough and for retaining a portion of the liquid during its flow, a counterbalanced rotatively supported displacing body in the casing whose specific gravity is approximately similar to the specific gravity of the liquid when of a standard density, said body being submerged in the liquid for being moved by the buoyant effort of the retained liquid when of a density varying from its known standard, a movable scale of gravity measurements on the casing, a movable pointer for indicating the measurements on the scale, means operative by the body when moved for moving the pointer to register on the scale the relative difference of density of the liquid, and a weight for keeping the scale in a determined position with respect to the pointer independent of the position of the casing.

8. A specific gravity register, comprising a casing having provision for flow of liquid therethrough and for retaining a portion of the liquid during its flow, a counterbalanced rotatively supported air chamber in the casing whose specific gravity is approximately similar to the specific gravity of the liquid when of a standard density, said body being submerged in the liquid for being moved by the buoyant effort of the retained liquid when of a density varying from its known standard, a movable scale of gravity measurements on the casing, a movable pointer for indicating the measurements on the scale, means operative by the body when moved for moving the pointer to register on the scale the relative difference of density of the liquid, means for separating and yieldingly holding the body, scale, pointer and their cooperative parts from their normal supports in the casing, and means for keeping the scale in a determined position with respect to the pointer independent of the position of the casing.

This specification signed and witnessed this 12th day of November, A. D. 1925.

WALTER J. ALBERSHEIM.